United States Patent

[11] 3,580,459

| [72] | Inventors | Arthur F. Gage<br>Warren;<br>Alex F. Stamm, Rochester, Mich. |
|---|---|---|
| [21] | Appl. No. | 769,964 |
| [22] | Filed | Oct. 23, 1968 |
| [45] | Patented | May 25, 1971 |
| [73] | Assignee | Rockwell-Standard Company<br>Pittsburgh, Pa. |

[54] VARIABLE POSITION MEANS FOR HOLDING A NONROTATING WORKPIECE IN FRICTION WELDING APPARATUS
14 Claims, 8 Drawing Figs.

[52] U.S. Cl. ................................................. 228/2,
29/470.3, 156/73, 269/242
[51] Int. Cl. ......................................................... B23k 27/00
[50] Field of Search ............................................ 228/2;
29/470.3; 156/73; 269/242, 244

[56] References Cited
UNITED STATES PATENTS

| 1,187,856 | 6/1916 | Moss | 269/242X |
| 1,239,620 | 9/1917 | Plotnik | 269/242X |
| 3,235,160 | 2/1966 | Walton | 228/2 |
| 3,238,612 | 3/1966 | Herman | 228/2 |
| 3,458,101 | 7/1969 | Martin | 228/2 |
| 3,484,296 | 12/1969 | Blum et al | 29/470.3 |

*Primary Examiner*—John F. Campbell
*Assistant Examiner*—Robert J. Craig
*Attorneys*—George R. Powers and John R. Bronaugh ABSTRACT: Friction welding apparatus including a pair of members having transversely facing workpiece engaging surfaces thereon for holding a nonrotating workpiece and adjusting means for varying the positions of the members relative to each other and a machine support. The adjusting means includes transverse adjusting means for selectively and independently moving the members toward or away from each other along an axis transverse to the normal welding axis and for selectively and independently moving the members as a unit in either direction along the transverse axis.

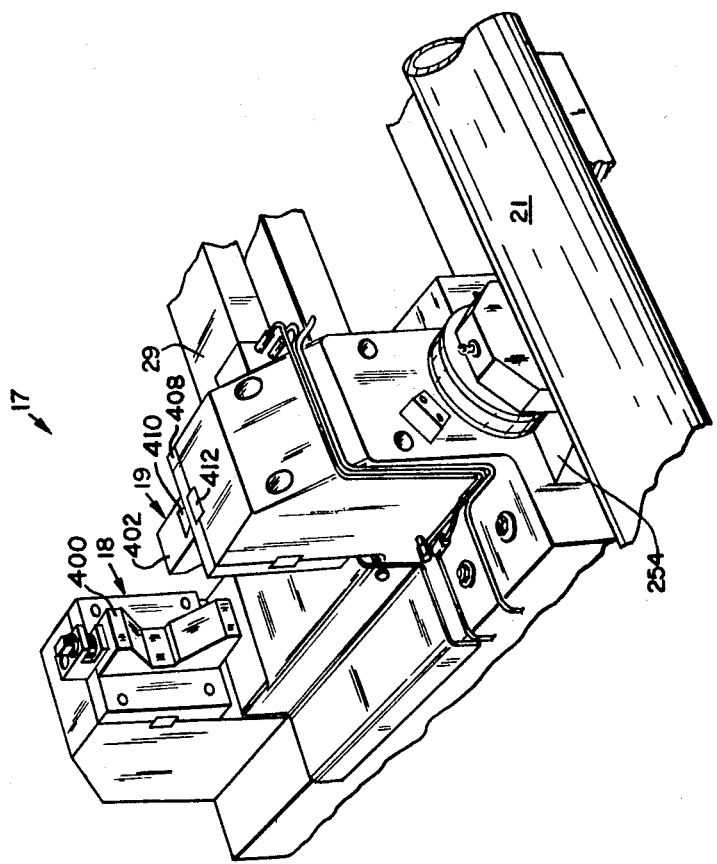

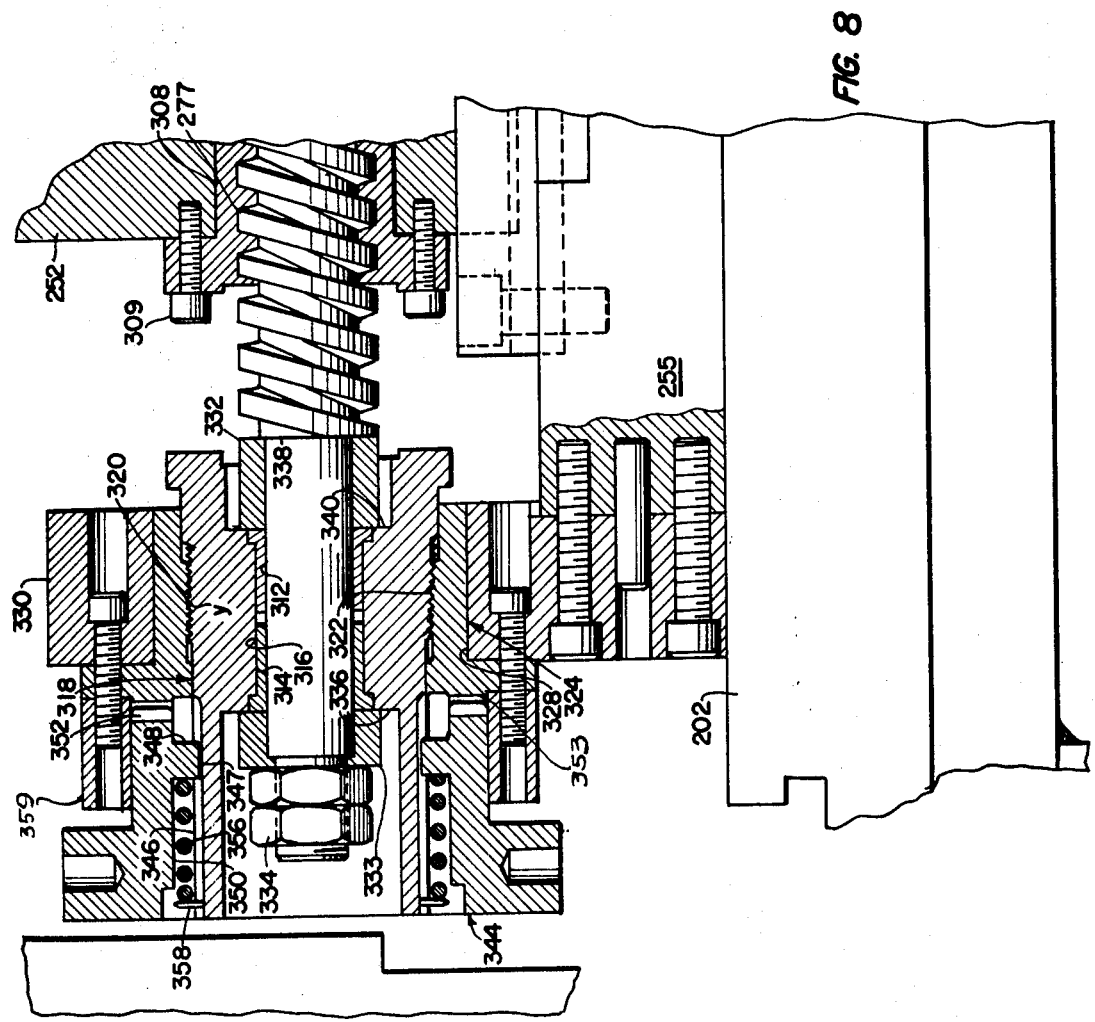

VARIABLE POSITION MEANS FOR HOLDING A NONROTATING WORKPIECE IN FRICTION WELDING APPARATUS

RELATED PATENT APPLICATION

The invention of this application is an improvement over the invention disclosed and claimed in copending patent application Ser. No. 650,317, entitled "Friction Welding Apparatus," filed on June 30, 1967, in the name of Arthur F. Gage and assigned to the assignee of this invention.

BACKGROUND OF THE INVENTION

1. Field of the Invention

This invention relates to means for holding a nonrotating workpiece in friction welding apparatus and, more particularly, to workpiece holding members that can be moved not only relative to each other, but also relative a fixed machine support in order to assure proper alignment between the workpiece and the holding means.

2. Description of the Prior Art

To friction weld together large components such as heavy steel drive axle components for large vehicles, it is necessary to apply very large axial thrust loads to the relative rotating components. While only axial forces are deliberately applied to the components, very large radial forces are generated between the rubbing components due to localized stick welds and other nonuniform conditions existing during the welding process. High strength holding devices are required to withstand these large forces and maintain the relatively rotating parts in proper alignment throughout the welding process. In particular, high strength jaw mechanisms must be provided for rigidly supporting the nonrotating workpiece. Such arrangements have been provided in the past, and one such arrangement will be described herein. Jaw arrangements available heretofore have not, however, been quickly and easily adjustable for accommodating the slight dimensional variations between successive workpieces. Because of these variations, it is often necessary to reposition the jaws between each welding cycle to accommodate the next workpiece. Where such is required, it is desirable that the adjustments be made quickly and easily, but these characteristics should not be attained at the expense of strength and rigidity.

SUMMARY OF THE INVENTION

It is therefore an object of this invention to provide improved means for holding the nonrotating workpiece in friction welding apparatus.

Another object is to provide for friction welding apparatus improved means for quickly and rapidly adjusting the relative positions of the workpiece holding members.

A further object is to provide improved means for adjusting the transverse positions of workpiece engaging jaws relative to each other and as a unit relative to the machine support.

A still further object of this invention is to provide improved means for adjusting the positions of workpiece engaging jaws along a mutually perpendicular set of coordinate axes.

Yet another object is to provide the foregoing objects without adversely affecting the strength and rigidity of the workpiece holding means.

Briefly stated, in carrying out the invention in one form, friction welding apparatus including a machine support has means movably mounted thereon for holding a nonrotating workpiece during the welding operation, the holding means including a pair of members having workpiece engaging surfaces thereon which transversely face each other along an axis transverse to the axis of rotation of the rotating workpiece. The holding means further includes adjusting means for selectively moving the members either toward or away from each other along the transverse axis or as a unit along the transverse axis in either direction. By a further aspect of the invention, the adjusting means further includes means for selectively and independently moving the members and the workpiece engaging surfaces along either or both the axes of rotation and an axis perpendicular to both the axis of rotation and the transverse axis. In this manner, the holding means can be positioned quickly and easily to accommodate any dimensional variations in the nonrotating workpiece.

By a still further aspect of the invention, the transverse adjusting means includes a shaft having axially spaced-apart oppositely threaded portions thereon, each threaded portion being operatively interconnected to a respective one of the members such that rotation of the shaft in a first direction will move the workpiece engaging surfaces toward each other and in a second direction will move the workpiece engaging surfaces away from each other. The transverse adjusting means also includes means for selectively shifting the shaft and consequently the workpiece engaging surfaces in either direction along the transverse axis. This latter means comprises a fixed nut, an adjustment screw threaded into the nut and being axially displaceable by selective rotation in either direction, means for transmitting axial displacement of the screw into corresponding axial displacement of the shaft, and means for locking the screw against rotation so as to secure the shaft in an axially fixed position.

DESCRIPTION OF THE DRAWINGS

While this specification concludes with claims particularly pointing out and distinctly claiming the subject matter forming the invention, the invention, together with further objects and advantages, may best be understood by reference to the following description taken in conjunction with the accompanying drawings, in which:

FIG. 5 is a generally perspective view of one of the end stationary workpiece clamping portions of the support structure;

FIG. 8 is an enlarged fragmentary view of the transverse adjustment structure shown in FIG. 6.

DETAILED DESCRIPTION

Figure 1:
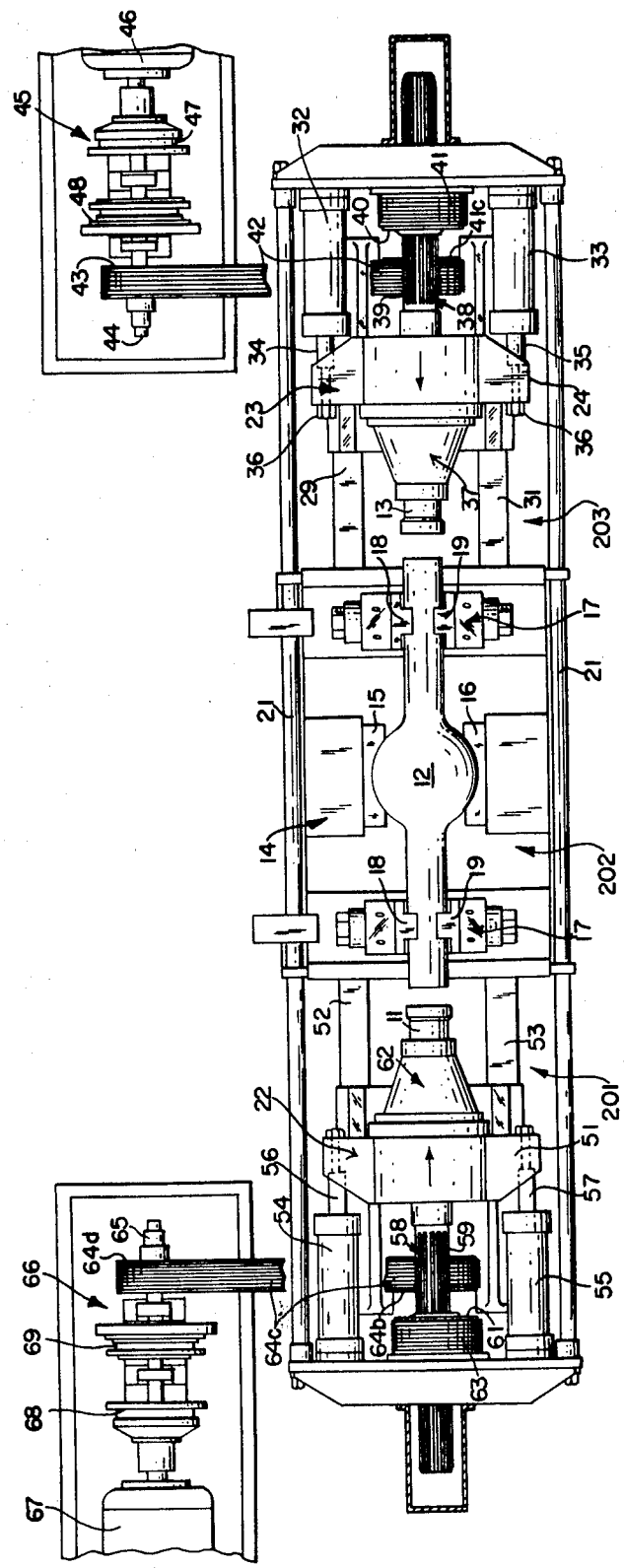
FIG. 1 is a plan view illustrating the arrangement of parts in friction welding apparatus incorporating the invention.
Figure 2:
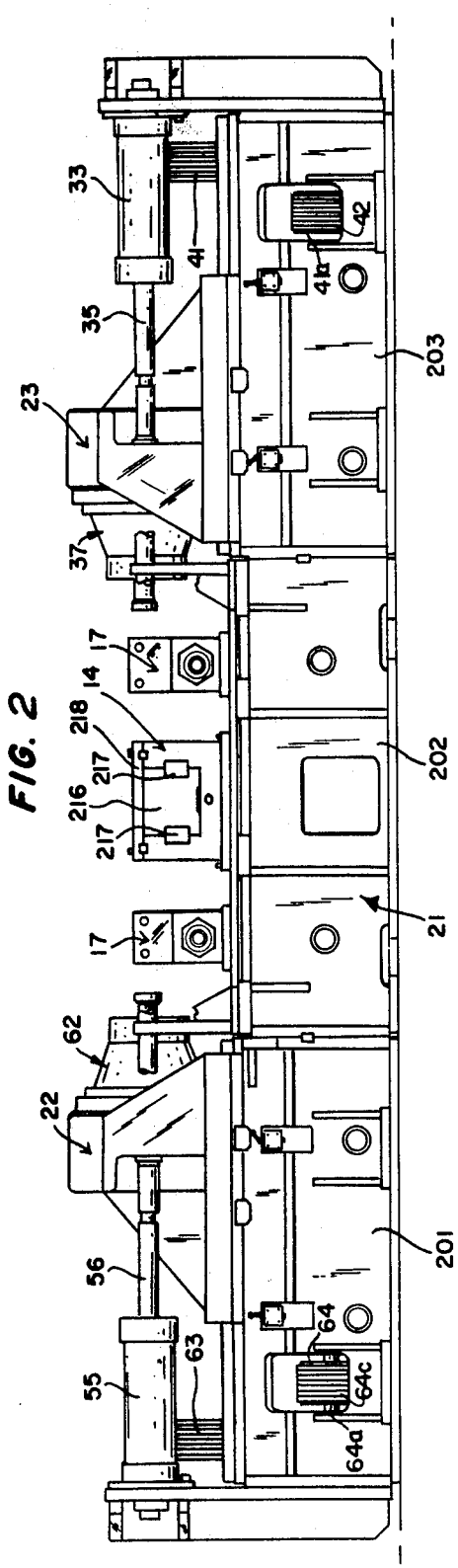
FIG. 2 is a side elevation showing the friction welding apparatus of FIG. 1.
Figure 3:
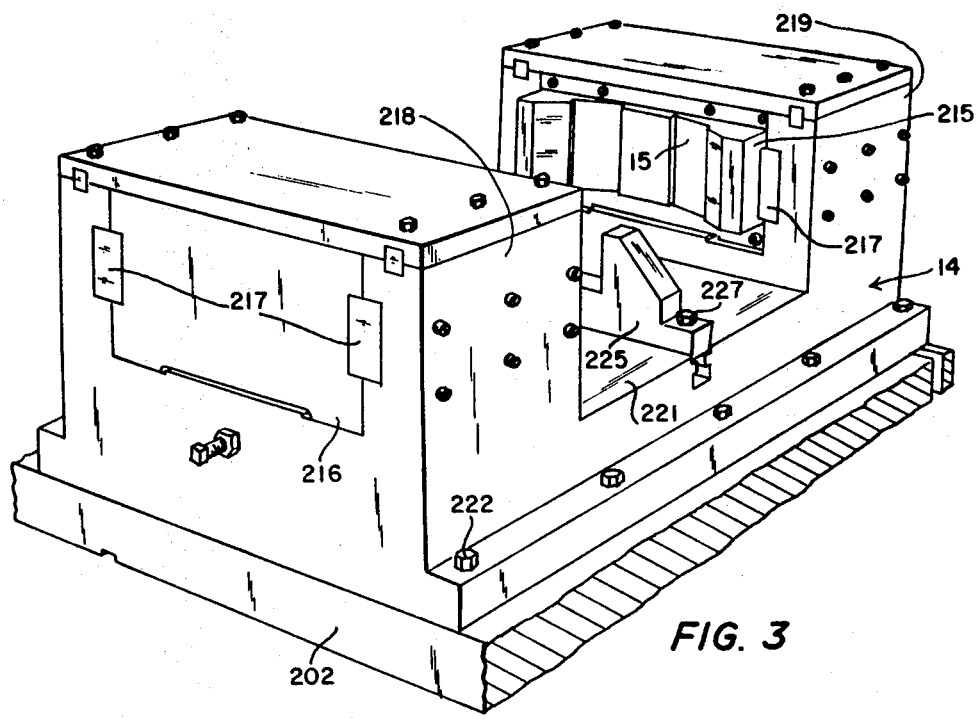
FIG. 3 is a generally perspective view of the center stationary workpiece clamping portion of the support structure.

FIGS. 1 and 2 illustrate a friction welding apparatus wherein three workpieces 11, 12 and 13 are adapted to be friction welded together. In this arrangement the central workpiece 12, which may be an axle housing center section, is held stationary and the other two workpieces 11 and 13, which may be wheel bearing end spindles, are rotated while being axially forced into engagement with opposite ends of workpiece 12.

The central, or nonrotating, workpiece 12 is mounted in a cradle structure 14 wherein opposite sides are engaged and held suitably by adjustable jaws 15 and 16. The oppositely extending arms of workpiece 12 are clamped tightly in fixtures 17, each of which has transversely opposed jaws indicated at 18 and 19 for gripping the workpiece, the jaws 18 and 19 being adjustable in accordance with the present invention. This arrangement supports and anchors workpiece 12 against rotation and axial displacement during welding. Cradle 14 and the fixtures 17 are secured rigidly to the machine base 21.

Workpiece 11 is mounted upon a hydrostatic bearing unit carrier 22 and workpiece 13 is mounted upon a similar hydrostatic bearing unit carrier 23 at opposite ends of base 21. These carriers 22 and 23 are mounted for axial sliding movement along the machine base 21. A pair of power cylinders 32 and 33 are fixed on base 21 with their piston rods 34 and 35 projecting into rigid connection with the frame 24 of carrier 23. Introduction of fluid under pressure into both cylinders 32 and 33 will advance the carrier 23 thereon toward the stationary workpiece 12. A shaft 38, located centrally of carrier 23 and midway between cylinders 32 and 33, has a splined section 39 which axially slidably but nonrotatably extends through the hub of an axially stationary pulley 40. Suitable belts drive the pulley 40 from an electric motor 46. Shaft 38 enters the hydrostatic bearing unit carrier 23 wherein as will appear it may be operably drive connected to rotate the workpiece 13. By confining pulley 40 against axial displacement and by providing the splined drive connection between pulley 40 and the shaft 38, continuous rotation of shaft 38 and the workpiece 13 need not be interrupted as the carrier 23 is axially displaced by the power cylinders 32 and 33. Workpiece 13 may thus be axially forced into rubbing engagement with the nonrotating workpiece 12 during the friction welding operation.

The workpiece 11 is held in a similar manner by the carrier 22 and may also be axially forced into rubbing engagement with the central workpiece 12 during the welding operation. Since the present invention relates to the manner by which the central workpiece 12 is held by the cradle 14 and the fixtures 17, the detailed nature of the supporting structure for the workpieces 11 and 13 will not be described herein. If such a description is desired for any reason, attention is directed to copending patent application Ser. No. 769,892, entitled "Friction Welding Apparatus Having Improved Hydrostatic Bearing Arrangements," filed on Oct. 23, 1968, now U.S. Pat. No. 3,544,120 issued Dec. 1, 1970, in the name of Alex F. Stamm and assigned to the assignee of this invention.

Before turning attention to the precise manner by which the workpiece 12 is grasped by the cradle 14 and the fixtures 17, it will be well to pause briefly to point out again that extremely large axial and radial forces are generated during the welding process. As a result, the cradle 14 and the fixtures 17 must be extremely strong and rigid in order to securely hold the nonrotating workpiece 12 in proper position throughout operation. The workpieces 12, as all mass produced components, may have small dimensional variations. As a result, the jaws 18 and 19 have to be repositioned to accommodate these dimensional variations from sample to sample. Heretofore, these adjustments have been difficult and time consuming to make. By the present invention, the jaws 18 and 19 may be repositioned easily and rapidly along a full set of coordinate axes to accommodate dimensional variations without adversely affecting strength and rigidity.

Referring now to FIGS. 1 through 4, the cradle 14 for mounting the center portion of the stationary workpiece 12 comprises an adjustable jaw central portion wherein jaws 15 and 16 face each other along an axis transverse to the axis of rotation of the workpieces 11 and 13. Jaws 15 and 16 are fixed on blocks 215 and 216 slidably mounted in transverse alignment on guideways 217 in laterally opposite columns 218 and 219 which form part of a U-shaped casting 221. Columns 218 and 219 extend upwardly from the crosspiece of casting 221 which is rigidly secured to the support structure as by bolts 222.

Midway between jaws 15 and 16, the crosspiece 221 is formed with a rectangular keyway 223 extending longitudinally on the machine centerline and in which are adjustably mounted a pair of clamp jaws 224 and 225 that may be locked by bolts 226 and 227 respectively. These are internal jaws fitting into the carrier mounting opening of a drive axle housing.

A fluid pressure cylinder 231 suitably mounted within the interior of the machine has its slidable piston rod 232 connected pivotally at 233 to a generally vertically extending lever 234 rockable about a fixed pivot 235 on the base. The upper end of lever 234 extends freely through an opening 236 in the machine base into the recessed interior 237 of jaw block 216 where it is slidably received. Similarly, casing 239 of the cylinder is pivoted at 241 to the lower end of a lever 242 connected to the jaw block 215 in a similar manner. Levers 234 and 242 are of the same length and effective leverage.

Figure 4:
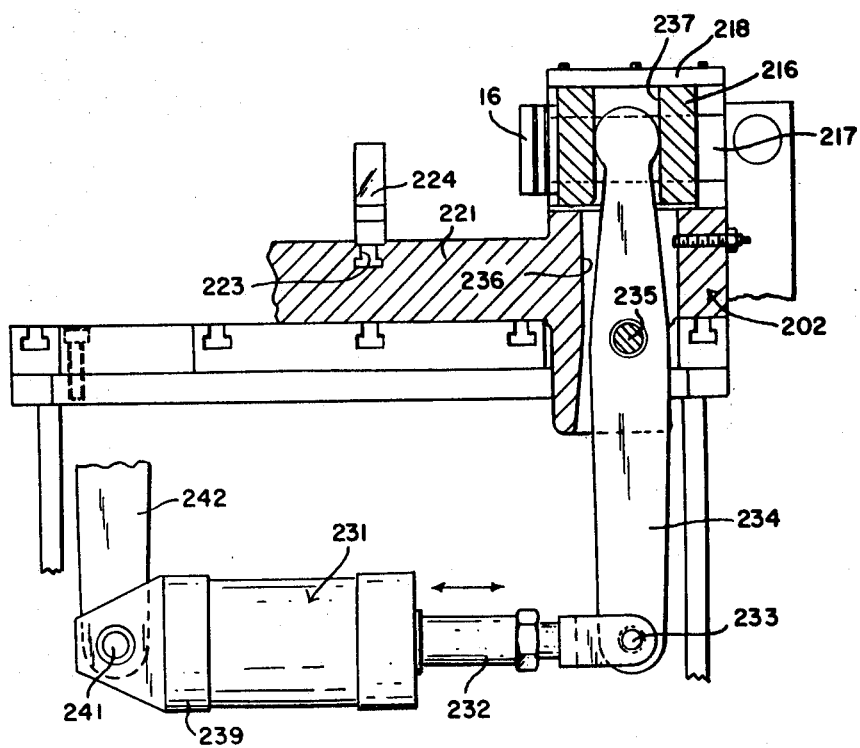
FIG. 4 is a fragmentary view partly broken away and in section showing the mechanism for moving the central stationary workpiece clamp jaws.

In operation, the parts are generally as shown in FIG. 4 in initial position with the levers 234 and 242 vertical and jaws 15 and 16 retracted, and horizontal cylinder 231 is in its contracted condition. When fluid under pressure is supplied to cylinder 231 during the proper part of the welding cycle, rod 232 is extended. This oppositely rocks both levers 234 and 242 to displace jaws 15 and 16 toward each other to grip the stationary workpiece 12. Due to the length of these levers a considerable clamping force is provided, and due to the interconnection of the levers by the fluid pressure cylinder compensate relative displacement of the jaws is permitted to insure an even centered grip on the stationary workpiece. This arrangement is described and claimed in the aforesaid related patent application Ser. No. 650,317.

Referring now to FIGS. 5 through 8, one of the unique end fixtures 17 of this invention will be described. As viewed therein, the jaws 18 and 19 are actually members 400 and 402 having workpiece engaging surfaces 404 and 406, respectively, thereon facing each other along an axis transverse to the axis of rotation of the rotating workpieces. The member 400 is movably mounted on a mounting plate 370 secured to an intermediate member or column 252. More particularly, the member 400 is mounted for selective vertical displacement on the mounting plate 370 by a vertical guide key 372. Key 372 is received in a mating keyway formed in member 400 to confine the member 400 and the workpiece engaging surface 404 against axial movement relative to plate 370. Plate 370 is keyed in a relatively fixed position to column 252 as indicated at 374 in FIG. 6.

Figure 6:
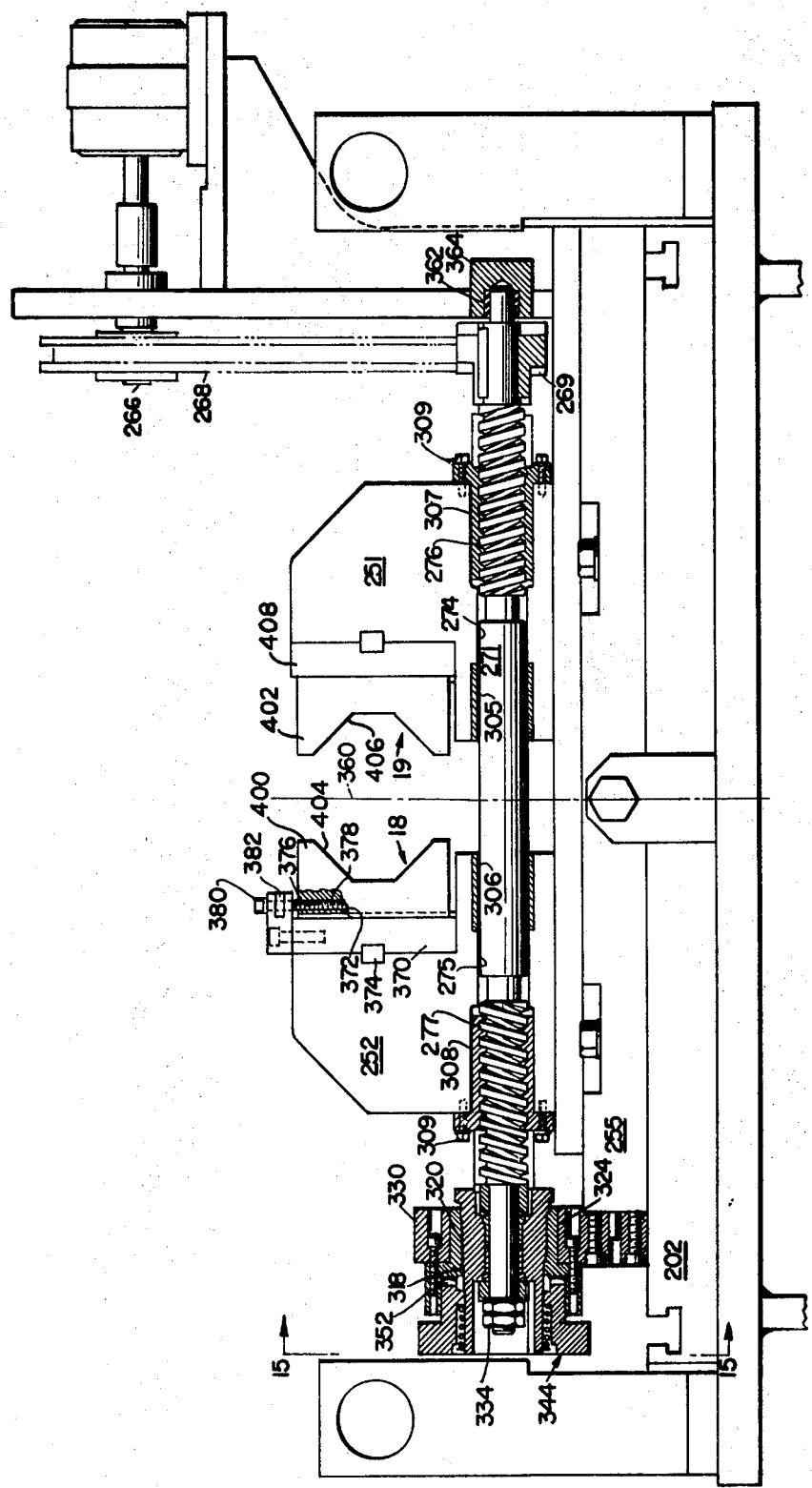
FIG. 6 is an end elevation view, partially in section, of the end clamping structure of FIG. 5.

Still referring to FIG. 6, a threaded bore 376 formed in member 400 receives a rotatable height adjustment screw 378 having a head 380 axially confined relative to the column 252 at 382. By turning screw 378 in opposite directions, the member 400 may be vertically raised or lowered by a selected distance. Member 402 is mounted on mounting plate 408 for limited vertical floating movement by a vertical guide key 410, and mounting plate 408 is in turn keyed to intermediate member or column 251 by key 412. The member 402 will thus align itself with the adjusted position of the member 400 when both members are moved transversely to engage and clamp the workpiece 12 in place. In this manner, slight vertical variations in the dimensions of the workpiece 12 can be easily and rapidly accommodated.

Figure 7:
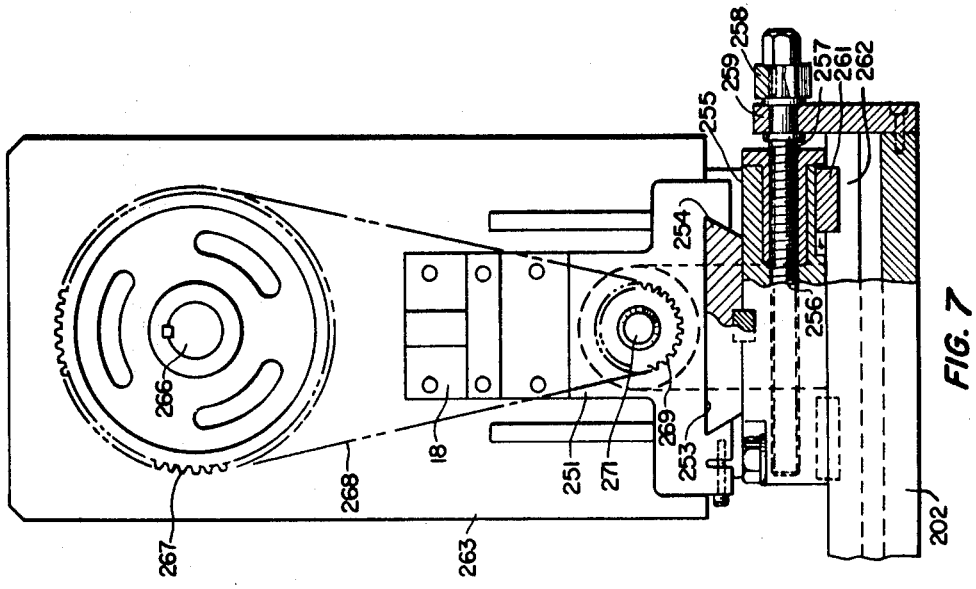
FIG. 7 is a side elevation view, partially in section, of the end clamping structure of FIG. 5.

As best illustrated by FIGS. 6 and 7, the lower ends of the columns 251 and 252 have dovetail recesses 253 therein which receive a correspondingly shaped transverse guide rail 254, which in turn is secured to a base plate 255 that is supported on the machine support structure. As shown in FIG. 7, plate 255 has a threaded bore 256 located longitudinally centrally of the machine receiving a screw 257 that has its head 258 rotatably mounted but axially fixed relative to the machine frame at 259. When screw 257 is turned in either direction, plate 255 is correspondingly displaced longitudinally of the machine, this being axially along the axis of rotation of the workpieces 11 and 13. Key 261 which projects into a keyway 262 is fixed to plate 255 and maintains longitudinal alignment of the members 400 and 402 with respect to the workpiece as the axial positions of the members 400 and 402 and the workpiece engaging surfaces 404 and 406 are adjusted by manipulation of screw 257. In this manner, slight variations in the length of the workpiece 12 can be easily and rapidly accommodated.

The novel manner by which the workpiece engaging surfaces 404 and 406 are moved transversely to the axis of rotation will now be described with reference to FIGS. 6 through 8. As illustrated, the base plate 255 has secured thereto an upright member 263 having a support 264 mounting a motor 265, the output shaft 266 of which carries a sprocket 267 connected by chain 268 to a sprocket 269 on a horizontal shaft 271. The shaft 271 is journaled in bores 274 and 275 of the columns 251 and 252, respectively, by sleeve bearing 305 and 306. Shaft 271 is formed with oppositely threaded sections 276 and 277 of the acme thread type. Flanged retainer sleeves 307 and 308, which are respectively fixed to columns 251 and 252 by machine screws 309, are respectively received in bores 274 and 275 and are internally threaded to respectively engage the threaded shaft sections 276 and 277 so that rotation of shaft 271 in one direction will advance members 400 and 402 toward each other into gripping relation with the stationary workpiece 12 and rotation in the other direction will move them away from each other. To operate as just described, the shaft 271 must be transversely fixed relative to the axis of rotation. Means will now be described which is capable of maintaining the shaft 271 in either a fixed transverse position for shifting the shaft 271, and consequently the surfaces 404 and 406, as a unit transversely of the rotational axis.

As best shown in FIG. 8, shaft 271 is formed between its left-hand end and threaded sections 277 with a cylindrically smooth section 312. Section 312 extends through and is journaled in a cylindrically smooth bore 314 by a pair of bushings 316. Bore 314 is formed through an adjustment screw 318 of annular cross section.

Screw 318 is provided with external threads 320 engaging an internally threaded bore section 322 which is formed in a nut 324. Nut 324 extends into a bore 328 which is formed through a support plate 330. Plate 330 is rigidly fixed to plate 255, and nut 324 is rigidly fixed to plate 330.

At opposite ends of bore 314, shaft section 312 mounts a pair of bushings 332 and 333. Bushing 333 is confined against axial displacement between a jam nut assembly 334 and internal annular shoulder 336. As viewed from FIG. 8, jam nut assembly 334 is threaded on the left-hand end of shaft 271 extending beyond bore 314. Shoulder 336 is integral with screw 318.

With continued reference to FIG. 8, bushing 332 is confined against axial displacement between two annular, opposed shoulders 338 and 340. Shoulder 338 is formed on shaft 271 between sections 277 and 312. Shoulder 340 is internally formed in screw 318. Shoulders 336 and 340 face in axially opposite directions and are at opposite ends of bore 314 as shown.

With the foregoing construction, shaft 271 is confined against axial displacement in opposite directions by seating engagement of bushings 332 and 333 with shoulders 340 and 336 respectively. Bushings 332 and 333 in cooperation with screw 318 thus retain shaft 271 in an axially adjusted position.

To adjust the axial position of shaft 271, a nut 344 is nonrotatably but slidably mounted on screw 318 by interengaging splines indicated at 346 and 347. Splines 346 are formed externally on screw 318, and splines 347 are formed on the inner periphery of an annular rib 348. Rib 348 is integral with nut 344 and extends radially into a bore 350 formed longitudinally through nut 344. Nut 344 is coaxial with and carried by screw 318.

To lock the assembly of nut 344 and screw 318 against rotation, coacting, radial teeth indicated at 352 and 353 are respectively formed on the adjacently disposed axially opposed end faces of nuts 344 and 324. When teeth 352 and 353 intermesh as shown in FIG. 8, the assembly of nut 344 and screw 318 is locked against rotation by virtue of being clenched to nut 324 which is fixed to plate 330. Screw 318 therefore cannot be threaded into or out of bore section 322 and consequently is locked against axial displacement relative to nut 324.

To normally maintain teeth 352 and 353 in meshing engaging, a coil spring 356 peripherally surrounding the splined portion of screw 318 is compressed axially between a retainer ring 358 and rib 348. Retainer ring 358 is fixed on the outer end of screw 318 as shown. Spring 356 reacts against ring 358 to bias nut 344 axially toward nut 324 and to a position where teeth 352 mesh with teeth 353. A spacer ring 359, fixed to nut 324, limits axial displacement of nut 344 under the bias exerted by spring 358.

By axially withdrawing nut 344 against the bias exerted by spring 356 and to a position where teeth 352 disengage from teeth 353, nut 344 may be turned selectively in either direction to thread screw 318 into or out of nut 324. Axial displacement of screw 318 to the left, as viewed from FIG. 8, axially shifts shaft 271 in the same direction and by an equal distance through engagement of shoulder 336 with bushing 333 and of bushing 333 with jam nut assembly 334. Axial displacement of screw 318 to the right, as viewed from the same figure, axially shifts shaft 271 to right by an equal distance through engagement of shoulder 340 with bushing 332 and of bushing 332 with shoulder 338.

Since columns 251 and 252 are threadedly engaged with shaft 271, axial displacement of shaft 271 to the left concomitantly shifts members 400 and 402 equal distances in the same direction. Likewise, axial displacement of shaft 271 to the right concomitantly shifts the members by equal distances to the right. Thus, jaws 18 and 19 are selectively displaceable as a unit in the same direction to adjust the positions of the jaws relative to the rotational axis.

From the foregoing description it will be appreciated that by turning nut 344 to unitarily shift the members 400 and 402 horizontally in one direction of the other, the horizontal distance between the workpiece engaging surfaces 404 and 406 remains the same. To adjust the horizontal distance between the surfaces, it is necessary to rotate shaft 271 in one direction or the other by operating motor 265 in the manner previously described.

Still referring to FIG. 6, the end of shaft 271 adjacent to sprocket 269 is slidably and rotatably received in a sleeve bearing 362. Bearing 362 is seated in a socket 364 which is fixed to the frame of the machine. Sprocket 269 is sufficiently wide to maintain engagement with chain 268 without causing misalignment of the drive chain when the transverse position of shaft 271 is adjusted.

In the manner just described, the transverse positions of the workpiece engaging surfaces 404 and 406 can be easily and rapidly varied either relative to each other or as a unit relative to the support structure of the friction welding apparatus.

From the foregoing, it will be appreciated that this invention provides improved means for holding the nonrotating workpiece in friction welding apparatus. More particularly, the invention provides improved means for easily and rapidly adjusting the workpiece engaging jaws along a mutually perpendicular set of coordinate axes without adversely affecting the strength and rigidity of the workpiece holding apparatus. In this manner, workpieces of varying sizes and shapes may be easily accommodated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What claim as new and desire to secure by Letters Patent is:

1. In friction welding apparatus for friction welding a nonrotating workpiece to a rotating workpiece, means for holding the nonrotating workpiece, said holding means comprising:

support structure, a pair of members having workpiece engaging surfaces thereon movably mounted on said support structure, said workpiece engaging surfaces facing each other along a transverse axis relative to the axis of rotation of the rotating workpiece, and means for adjusting the relative positions of said members and said transversely facing workpiece engaging surfaces relative to said support structure for selectively clamping and unclamping the nonrotating workpiece, said adjusting means comprising transverse adjusting means for selectively and independently moving said members and said workpiece engaging surfaces toward or away from each other along said transverse axis and for selectively and independently moving said members and said workpiece engaging surfaces as a unit in either direction along said transverse axis, said adjusting means further comprising axial adjusting means for selectively and independently moving said members and said workpiece engaging surfaces as a unit in either direction along the axis of rotation of the rotating workpiece.

2. In friction welding apparatus for friction welding a nonrotating workpiece to a rotating workpiece, means for holding the nonrotating workpiece as defined by claim 1, said adjusting means further comprising means for selectively and independently moving said members and workpiece engaging surfaces in either direction along an axis perpendicular to both said transverse axis and the axis of rotation of the rotating workpiece.

3. In friction welding apparatus for friction welding a nonrotating workpiece to a rotating workpiece, means for holding the nonrotating workpiece as defined by claim 2, said adjusting means further comprising axial adjusting means for selectively and independently moving said members and said workpiece engaging surfaces as a unit in either direction along said rotational axis whereby said transverse axis, said perpendicular axis, and said rotational axis comprise a mutually perpendicular set of coordinate axes.

4. In friction welding apparatus for friction welding a nonrotating workpiece to a rotating workpiece, means for holding the nonrotating workpiece as defined by claim 1, said holding means further comprising a base member mounted on said support structure for movement relative thereto along the axis of rotation of the rotating workpiece and a pair of intermediate members mounted on said base member for movement relative thereto along said transverse axis, each of said members having workpiece engaging surfaces thereon mounted on a respective one of said intermediate members.

5. In friction welding apparatus for friction welding a nonrotating workpiece to a rotating workpiece, means for holding the nonrotating workpiece as defined by claim 4, said transverse adjusting means comprising screw means intermediate said base member and said intermediate members, said adjusting means further comprising screw means intermediate said support structure and said base member for selectively and independently moving said base member in either direction along the axis of rotation and screw means intermediate a selected one of said members having workpiece engaging surfaces thereon and said respective intermediate member for selectively and independently moving said member in either direction along an axis perpendicular to both said transverse axis and the axis of rotation, and means connecting the other of said members having workpiece engaging surfaces thereon to said respective intermediate member for permitting said other member to float along said perpendicular axis in substantial alignment with said selected member.

6. In friction welding apparatus for friction welding a nonrotating workpiece to a rotating workpiece, means for holding the nonrotating workpiece as defined by claim 1, said transverse adjusting means comprising:

a shaft having thereon axially spaced-apart oppositely threaded portions, means supporting said shaft for rotation about said transverse axis, a pair of internally threaded means transversely interconnected to respective ones of said members having workpiece engaging surfaces thereon receiving said right-hand and left-hand threaded portions such that rotation of said shaft in a first direction will move said workpiece engaging surfaces toward each other to engage a nonrotating workpiece and in a second direction will move said surfaces away from each other to release the workpiece, and means connected to said shaft to selectively shift said shaft and consequently said workpiece engaging surfaces in either direction along said transverse axis.

7. In friction welding apparatus for friction welding a nonrotating workpiece to a rotating workpiece, means for holding the nonrotating workpiece as defined by claim 6 wherein said means for selectively shifting said shaft axially in either direction comprises a fixed nut, an adjustment screw threaded into said nut and being axially displaceable by selective rotation thereof in either direction, and means interconnecting said screw and said shaft for transmitting axial displacement of said screw into corresponding axial displacement of said shaft.

8. In friction welding apparatus for friction welding a nonrotating workpiece to a rotating workpiece, means for holding the nonrotating workpiece as defined by claim 7 in which said means for selectively shifting said shaft axially further comprises means for releasably locking said screw against rotation, said means for transmitting axial displacement of said screw into corresponding axial displacement of said shaft cooperating with said screw when said screw is locked against rotation to axially secure said shaft in a fixed adjusted position.

9. In friction welding apparatus for friction welding a nonrotating workpiece to a rotating workpiece, means for holding the nonrotating workpiece as defined by claim 8 wherein said means releasably locking said screw comprises a rotatable part selectively displaceable between a locking position and a release position, and coacting means on said part and said nut for locking said part against rotation relative to said nut when said part is in its locking position and for permitting rotation of said part relative to said nut when said part is shifted to its release position, said part being relatively nonrotatably engaged with said screw in both of said release and locking positions to prevent rotation of said screw relative to said nut when in its locking position and to allow rotation of said screw relative to said nut when in its release position.

10. In friction welding apparatus for friction welding a nonrotating workpiece to a rotating workpiece, means for holding the nonrotating workpiece as defined by claim 10 wherein said coacting means on said part and said nut comprises cooperating sets of teeth respectively formed rigid with said part and said nut and being intermeshed when said part is in its locking position and being out of meshing engagement when said part is in its release position.

11. In friction welding apparatus for friction welding a nonrotating workpiece to a rotating workpiece, means for holding the nonrotating workpiece as defined by claim 10 wherein said part is of annular cross section and peripherally surrounds said screw, said part being displaceable between its locking and release position by axially shifting it relative to said screw.

12. In friction welding apparatus for friction welding a nonrotating workpiece to a rotating workpiece, means for holding the nonrotating workpiece as defined by claim 11 in which said means releasably locking said screw further comprises spring means peripherally surrounding said screw and biasing said part axially to its locking position.

13. In friction welding apparatus for friction welding a nonrotating workpiece to a rotating workpiece, means for holding the nonrotating workpiece as defined by claim 12, said holding means further comprising a base member mounted on said support structure for movement relative thereto along the axis of rotation of the rotating workpiece and a pair of intermediate members mounted on said base member for movement relative thereto along said transverse axis, each of said members having workpiece engaging surfaces thereon mounted on a respective one of said intermediate members, said transverse adjusting means interconnecting said base member and said intermediate members.

14. In friction welding apparatus for friction welding a nonrotating workpiece to a rotating workpiece, means for holding the nonrotating workpiece as defined by claim 13, said adjusting means further comprising screw means intermediate said support structure and said base member for selectively and independently moving said base member in either direction along the axis of rotation of the rotating workpiece and screw means intermediate a selected one of said members having workpiece engaging surfaces thereon and said respective intermediate members for selectively and independently moving said member in either direction along an axis perpendicular to both said transverse axis and the axis of rotation, and means connecting the other of said members having workpiece engaging surfaces thereon to said respective intermediate member for permitting said other member to float along said perpendicular axis in substantial alignment with said selected member.

UNITED STATES PATENT OFFICE
CERTIFICATE OF CORRECTION

Patent No. 3,580,459            Dated May 25, 1971

Inventor(s) ARTHUR F. GAGE and ALEX F. STAMM

It is certified that error appears in the above-identified patent and that said Letters Patent are hereby corrected as shown below:

Column 5, lines 67 and 68, change "engaging" to

-- engagement --;

Column 8, line 36, change "10" to -- 9 --.

Signed and sealed this 28th day of September 1971.

(SEAL)
Attest:

EDWARD M. FLETCHER, JR.          ROBERT GOTTSCHALK
Attesting Officer                 Acting Commissioner of Patents